(12) United States Patent
Malla et al.

(10) Patent No.: US 6,610,136 B2
(45) Date of Patent: *Aug. 26, 2003

(54) PIGMENTS FOR INK JET PAPER

(75) Inventors: Prakash B. Malla, Dublin, GA (US); Siva Devisetti, Sandersville, GA (US)

(73) Assignee: Thiele Kaolin Company, Sandersville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/104,255

(22) Filed: Mar. 21, 2002

(65) Prior Publication Data

US 2003/0019399 A1 Jan. 30, 2003

Related U.S. Application Data

(63) Continuation-in-part of application No. 09/824,885, filed on Apr. 3, 2001, now Pat. No. 6,478,865.

(51) Int. Cl.[7] .......... C04B 14/00; C04B 14/04; C04B 14/10
(52) U.S. Cl. .......... 106/464; 106/416; 106/436; 106/439; 106/442; 106/444; 106/449; 106/456; 106/459; 106/461; 106/463; 106/466; 106/467; 106/468; 106/469; 106/483; 106/484; 106/485; 106/486; 106/400; 106/487; 106/DIG. 4; 106/465; 241/22; 162/181.1; 162/181.3; 162/181.4; 162/181.5; 162/181.6; 162/181.8
(58) Field of Search .......... 106/416, 436, 106/439, 442, 444, 449, 456, 459, 461, 463, 464, 466, 467, 468, 469, 483, 484, 485, 486, 400, DIG. 4, 487, 465; 241/22; 423/610, 625, 624, 635, 632; 162/181.6, 181.1, 181.8, 181.3, 181.4, 181.5

(56) References Cited

U.S. PATENT DOCUMENTS

| | | | |
|---|---|---|---|
| 3,586,523 A | 6/1971 | Fanselow et al. |
| 4,851,048 A | 7/1989 | Jones et al. |
| 5,261,956 A | 11/1993 | Dunaway et al. |
| 5,643,631 A | 7/1997 | Donigian et al. |
| 5,827,363 A | 10/1998 | Darsillo et al. |
| 5,856,397 A | 1/1999 | Pope et al. |
| 5,997,625 A | 12/1999 | Londo et al. |
| 6,150,289 A | 11/2000 | Chen et al. |

OTHER PUBLICATIONS

PCT International Publication No. WO 98/36029; Chen et al.; Date of Publication—Aug. 20, 1998.

*Primary Examiner*—Michael Marcheschi
(74) *Attorney, Agent, or Firm*—Baker, Donelson, Bearman & Caldwell (57) ABSTRACT

Aggregated mineral pigments (such as kaolin clay pigments) having a high surface area and useful in coating and filling compositions for ink jet printing media are manufactured by dry grinding an unground mineral composition starting material and then optionally acid treating the ground material.

27 Claims, 5 Drawing Sheets

PIGMENTS FOR INK JET PAPER

This application is a continuation-in-part of, and claims the benefit of, U.S. patent application Ser. No. 09/824,885; filed Apr. 3, 2001, now U.S. Pat. No. 6,478,865.

TECHNICAL FIELD

This invention relates to aggregated pigments having a low light scattering coefficient and a high surface area. In a more specific aspect, this invention relates to aggregated pigments which have a high surface area and a low light scattering coefficient and which are useful in coating compositions for ink jet printing media. This invention also relates to a process for the manufacture of these aggregated pigments.

This invention will be described in detail with specific reference to kaolin clay. However, this invention will be understood as applicable to other mineral compositions, such as natural calcium carbonate, precipitated calcium carbonate, calcium sulfate (normally known as gypsum), bentonite, talc, aluminum oxide, aluminum hydroxide, zeolite, titanium dioxide, iron oxide and iron hydroxide.

BACKGROUND OF THE INVENTION

Kaolin is a naturally occurring, relatively fine, white clay mineral which may be generally described as a hydrated aluminum silicate. After purification and beneficiation, kaolin is widely used as a filler and pigment in various materials, such as rubber and resins, and in various coatings, such as paints and coatings for paper.

The use of kaolin in paper coatings serves, for example, to improve brightness, color, gloss, smoothness, opacity, printability and uniformity of appearance of the coated paper. As a filler in paper formulations, kaolin is used to extend fiber and reduce cost, and to improve opacity, brightness and other desirable characteristics of the filled paper product.

Calcined kaolin is a particular type of kaolin and is often used in large quantities for paper manufacture. Calcined kaolin can be obtained by heating (i.e., calcining) beneficiated kaolin clay at temperatures of at least 550° C. The calcination step dehydroxylates and converts the kaolin into a noncrystalline aluminosilicate phase or metakaolin. The term "dehydroxylates" refers to the removal of structural hydroxyl groups from the kaolin in the form of water vapor. The smaller particles of the feed clay are aggregated by calcination, and this aggregation increases the original volume of the kaolin and gives the calcined kaolin a "fluffy" appearance. Particle aggregation increases the light scattering characteristics of the kaolin (as compared to non-calcined kaolin) and, therefore, contributes a high degree of opacity to a coated paper. In addition, calcination increases the brightness of the kaolin.

Fanselow et al. U.S. Pat. No. 3,586,523 describes calcined kaolin clays.

Calcined kaolin clay pigments (such as those marketed by Thiele Kaolin Company of Sandersville, Ga. under the trademarks KAOCAL and KAOCAL LA) are widely used in the paper industry. The high brightness of the calcined clay is partly due to the removal of organic material at elevated temperatures. The brightness can also be improved through pre-calcination beneficiation processes such as magnetic separation, froth flotation, selective flocculation and chemical leaching.

Hydrous kaolin clay is another conventional product (such as that marketed by Thiele Kaolin Company under the trademark KAOFINE 90) which is widely used in the paper industry. This particular type of kaolin has not been subjected to a calcination step.

Both hydrous and calcined clay products are useful in coating compositions for conventional printing applications such as offset, rotogravure, letterpress and flexographic. However, without substantial mechanical and/or chemical modifications, hydrous and calcined clay products are not useful in coating compositions for ink jet printing applications.

In an ink jet printing process, uniformly shaped tiny droplets of aqueous or solvent based dye solutions are ejected from a nozzle onto a substrate. There are two primary types of ink jet printing—continuous ink jet printing and drop on demand ink jet printing (DOD). The continuous ink jet is used in high speed printing such as addressing, personalization, coding and high resolution color printing such as proofing. The DOD ink jet is mainly used in home, office and wide format printing.

The thermal ink jet printer is the most common DOD ink jet currently available. In this system, ink is heated and vaporized periodically with a heating element connected to the digital data to generate bubbles. Since the volume of the ink increases during vaporization, the ink is forced out of the nozzle in the form of a drop which travels and is deposited on the paper.

The inks used in ink jet printing are commonly dilute solutions of water-soluble organic dyes. The solvent portion of these inks can be as high as 98% and is a mixture of water and high boiling point alcohols. Many of the dyes used in ink jet printing inks contain sulfonic and caboxylic acid groups. At the pH of the ink, these groups are ionized and become anionic. Once deposited on the substrate, the ink must dry quickly to avoid spreading to the adjacent printing pixel. Because of the large amount of solvent used in ink jet inks, the coating must be sufficiently absorbent to remove the solvent away from the surface so that the inks will not smear. At the same time, for sharp edge acuity, the coating must fix the dye in the ink on the surface with no lateral spreading.

There are three major requirements for pigments/coatings to provide good ink jet printing characteristics: (1) high surface area and porosity for rapid absorption of the ink liquid, (2) cationic surface charge to quickly fix or immobilize the anionic ink jet dyes on the surface of the printed substrate and (3) low light scattering which improves the color of the printed image by not diluting the colors as the ink penetrates into the printed substrate.

Currently, silica is the pigment of choice for ink jet coating. Silica enhances ink jet printing by virtue of its high surface area (>150$m^2$/g) and porosity. However, silica is much more expensive than conventional pigments based on kaolin or calcium carbonate. Also, silica imparts high viscosity to the coating and cannot be made down at high levels of coating solids. Because of the viscosity/solids issue with silica, the coating machines cannot be integrated with paper making machines and consequently must be operated offline. This offline situation effectively reduces the productivity of the paper mills.

Several non-silica based pigments for ink jet paper coating applications have recently been introduced. For example, heat aged precipitated calcium carbonate with a surface area of at least 60 $m^2$/g is described in Donigan et al. U.S. Pat. No. 5,643,631. This material is claimed to reduce feathering, spreading and penetration or backside show through, as well as improve optical density, dry time and water fastness.

Chen et al. PCT International Publication No. WO/98/36029 and Chen et al. U.S. Pat. No. 6,150,289 describe a coating composition comprising 100 parts calcined clay, 5–50 parts by weight of a cationic polymer, 20–30 parts by weight polyvinyl alcohol, 30–50 parts by weight of a latex binder and 0–5 parts by weight of a cross-linking agent.

Londo et al. U.S. Pat. No. 5,997,625 describes a coating composition comprising a fine particle hydrous clay, a caustic leached calcined clay and a porous mineral (zeolite). This composition exhibits the best overall color density and color definition compared with the individual components.

For various reasons, the above described products fail to provide either cost-effectiveness or performance advantages over the conventional silica pigment. Thus, there is a need in the industry for cost-effective coating pigments having equivalent or improved printing performance and Theological characteristics over silica for ink jet printing media.

SUMMARY OF THE INVENTION

Briefly described, the present invention provides aggregated pigments which have a high surface area and low light scattering and which are useful in coating and filling compositions for ink jet printing media. The present invention also provides a process for the manufacture of these aggregated pigments. Again, although described with regard to kaolin clay, the present invention will be understood as applicable to other mineral compositions such as natural calcium carbonate, precipitated calcium carbonate, bentonite, talc, calcium sulfate (gypsum), zeolite, titanium dioxide, iron oxide, iron hydroxide, aluminum oxide and aluminum hydroxide.

As used in this application, the term "high surface area" refers to the surface area of the pigments of this invention, and this surface area is higher (i.e., greater) than the surface area of the starting material. Likewise, the term "aggregated" refers to the morphology of the ground product particles, which are clusters of a few to several fine individual particles that are smaller than the original starting material particles. Also, "low light scattering" refers to the light scattering coefficient of the pigments of this invention, and this light scattering is lower than the light scattering of the starting material. This aggregated morphology, high surface area and low light scattering enable the pigments of this invention to be useful in coating compositions for ink jet printing media.

As will be seen in greater detail below, the pigments of this invention have other characteristics which are either equivalent to or improved over the corresponding characteristics of silica.

Accordingly, an object of this invention is to provide an aggregated pigment having a high surface area and low light scattering.

Another object of this invention is to provide an aggregated pigment having a high surface area and low light scattering and which is useful in coating and filling compositions.

Another object of this invention is to provide an aggregated pigment having a high surface area and low light scattering and which is useful in coating and filling compositions for ink jet printing media.

Another object of this invention is to provide an aggregated kaolin clay pigment having a high surface area and low light scattering.

Another object of this invention is to provide an aggregated kaolin clay pigment having a high surface area and low light scattering and which is useful in coating and filling compositions.

Another object of this invention is to provide an aggregated kaolin clay pigment having a high surface area and low light scattering and which is useful in coating and filling compositions for ink jet printing media.

Another object of this invention is to provide an aggregated mineral pigment having a high surface area and low light scattering.

Another object of this invention is to provide an aggregated mineral pigment having a high surface area and low light scattering and which is useful in coating and filling compositions.

Another object of this invention is to provide an aggregated mineral pigment having a high surface area and low light scattering and which is useful in coating and filling compositions for ink jet printing media.

Still another object of this invention is to provide a process for the manufacture of an aggregated pigment having a high surface area and low light scattering.

Still another object of this invention is to provide a process for the manufacture of an aggregated pigment having a high surface area and low light scattering and which is useful in coating and filling compositions.

Still another object of this invention is to provide a process for the manufacture of an aggregated pigment having a high surface area and low light scattering and which is useful in coating compositions and filling for ink jet printing media.

Still another object of this invention is to provide a process for the manufacture of an aggregated kaolin clay pigment having a high surface area and low light scattering.

Still another object of this invention is to provide a process for the manufacture of an aggregated kaolin clay pigment having a high surface area and low light scattering and which is useful in coating and filling compositions.

Still another object of this invention is to provide an aggregated kaolin clay pigment having a high surface area and low light scattering and which is useful in coating and filling compositions for ink jet printing media.

Yet still another object of this invention is to provide a process for the manufacture of an aggregated mineral pigment having a high surface area and low light scattering.

Yet still another object of this invention is to provide a process for the manufacture of an aggregated mineral pigment having a high surface area and low light scattering and which is useful in coating and filling compositions.

Yet still another object of this invention is to provide a process for the manufacture of an aggregated mineral pigment having a high surface area and low light scattering and which is useful in coating and filling compositions for ink jet printing media.

These and other objects, features and advantages of this invention will become apparent from the following detailed description.

DETAILED DESCRIPTION OF THE INVENTION

The present invention relates to a mineral pigment (such as kaolin clay, calcined kaolin clay, calcium carbonate, calcium sulfate, bentonite, talc, zeolite, aluminum hydroxide, titanium dioxide, iron oxide, iron hydroxide and aluminum oxide) having a high degree of aggregation, high surface area and low light scattering coefficient, which is produced by a process comprising the sequential steps of (A) obtaining a beneficiated, unground mineral composition starting material; and (B) dry grinding the starting material under conditions of high intensity, whereby the ground ultrafine particles are aggregated to yield a product that is increased in surface area and decreased in light scattering coefficient over those characteristics of the unground starting material.

The present invention also relates to a process for the manufacture of a mineral pigment (such as kaolin clay, calcined kaolin clay, calcium carbonate, calcium sulfate, bentonite, talc, zeolite, titanium dioxide, iron oxide, iron hydroxide, aluminum hydroxide and aluminum oxide) having a high degree of aggregation, high surface area and low light scattering coefficient, wherein the process comprises the sequential steps of (A) obtaining a beneficiated, unground mineral composition starting material; and (B) dry grinding the starting material under conditions of high intensity, whereby the ground ultrafine particles are aggregated to yield a product that is increased in surface area and decreased in light scattering coefficient over those characteristics of the unground starting material.

In this application, the term "unground" refers to a mineral composition which has not been subjected to any dry grinding under conditions of high intensity.

The preferred mineral composition starting material for this invention is hydrous kaolin clay, calcined kaolin clay, bentonite, natural calcium carbonate, precipitated calcium carbonate, calcium sulfate, talc, zeolite, titanium dioxide, aluminum hydroxide, aluminum oxide, iron oxide, iron hydroxide or a mixture of two or more of these minerals.

As discussed earlier, a highly absorbent pigment (that is, a pigment having a high surface area and high porosity) is necessary for ink jet coating to remove the ink solvent rapidly away from the surface (also referred to as ink drying). However, the surface area of hydrous kaolin clays ranges from 5–25m$^2$/g, which is lower than the ~150–600 m$^2$/g surface area of a silica pigment. Because of the lower surface area, hydrous kaolin clays are not suitable pigments for coating ink jet printing paper. However, we have found that hydrous kaolin clay, after controlled high intensity dry grinding, improves ink drying, image formation (also referred to as image acuity) and color density over the original unground hydrous kaolin clay.

These improvements in ink drying and image formation of the pigments of this invention are due to the increases in porosity, pore size and surface area. The increases in porosity and pore size (as measured by Mercury Porosimetry) can be attributed to an increase in particle size as a result of particle aggregation. Normally, as particle size increases, surface area is expected to decrease. However, in the present invention, the particle size first decreases as a result of a very high impact of the grinding media. The broken fine particles are then aggregated to form larger particles. The high surface area of the ground products indicates that the aggregates are not very dense, and nitrogen molecules used in measuring the surface area detect the high surface area of the fine particles.

As mentioned above, the intense dry grinding process increases pore size beyond what is optimum or near optimum for light scattering. Consequently, the light scattering coefficient of most of the pigment products of this invention is reduced, especially the starting materials that have a relatively high scattering coefficient (>0.35). The reduced light scattering coefficient, in turn, improves the color density of the printed image by not diluting the color as the ink penetrates into the coated sheet. However, prolonged grinding should be avoided since such grinding increases particle size with concomitant increases in the 325 mesh screen residue as a result of large and hard agglomeration of the particles. Also, prolonged grinding will require more energy, thereby increasing the cost of production, while not improving the product quality.

A calcined clay coating is improved in ink drying over hydrous clay products because of the high porosity of the calcined clay. However, having a relatively low color density as compared to hydrous clay, calcined clay is not suitable for ink jet coating applications. As discussed above, the lower color density of calcined clay can be attributed to its high light scattering ability.

By controlled intense dry grinding, we have found that the light scattering coefficient of calcined clay can be reduced significantly and the color density of the printed image can be improved over that of the original calcined clay. Like hydrous clay, the ground calcined clay is heavily aggregated with increases in surface area and pore size, although >50% of the original pore volume (i.e., porosity) is lost after grinding. The decrease in pore volume and increase in pore size after grinding are responsible for the reduced scattering coefficient of ground calcined clay. Despite the reduction in pore volume, the remaining porosity of the aggregated product is sufficient to provide rapid ink drying of the printed image.

Natural and precipitated (i.e., synthetic) calcium carbonate pigments are widely used in conventional paper coating and/or filling applications. These pigments are also not suitable for ink jet coating application due to poor ink absorption and poor image formation. However, this invention can significantly modify the properties of these pigments to make them useful in ink jet coating applications. As with hydrous kaolin, this invention increases aggregation (particle size), porosity, pore size and surface area and decreases light scattering coefficient as compared to the starting feed material.

Bentonite is not used in paper coating, but it is used in small quantities in paper making processes as a deinking agent, pitch control agent and retention aid. Bentonite is a rock term used to describe a naturally occurring fine-grained material predominantly composed of the mineral smectite. Smectite is a 2:1 hydrous layer aluminosilicate containing various alkali and alkaline earth metal cations in the interlayer. Smectites are further classified into beidellite, nontronite, saponite and montmorillonite depending on their crystal chemical characteristics. As with calcium carbonate, bentonite can also be ground at high intensity to yield a aggregated high surface area pigment suitable for ink jet coating applications.

Talc is used in small quantities in paper coating and filling applications. Talc refers to a hydrous layer magnesium silicate mineral. Normally, talc used in paper coating applications is much coarser than kaolin clays. Like other minerals described above, dry grinding at high intensity yields an aggregated high surface talc product suitable for ink jet coating applications. Because of the very coarse particle size of the starting talc (unlike clay, calcium carbonate and bentonite), talc requires higher grinding intensity or retention time to achieve a desirable degree of aggregation for ink jet coating applications.

High intensity dry grinding is essential in the present invention to produce aggregates with a high surface area. However, the high intensity dry grinding also results in unavoidable oversized aggregates which remain as residue in a subsequent slurry screening process. Typically, about 1–2% residue (325 mesh screen) is present in the ground product. The presence of such a high amount of residue is not acceptable for commercial coating or filling applications and, therefore, must be removed by screening. The high level of 325 mesh screen residue can cause scratches in commercial blade coating process. Typically, for a coating grade pigment, a 325 mesh screen residue of 0.01% or lower is desirable. However, the screening of a slurry at high solids with a high amount of residue is slow and difficult and also decreases production efficiency. Ideally, the residue should be minimized before a slurry makedown and screening process.

We have found that subjecting the ground product to a pulverization step significantly reduces the 325 mesh screen residue. The pulverization can be performed using commercially available systems, such as a Mikro-ACM mill sold by Hosokawa Micron Powder Systems, Summit, N.J. A brief description of Mikro-ACM mill is as follows: The feed material is fed via a rotary valve into the mill. The airflow through the mill provided by a blower behind the baghouse collection system conveys the material into the pulverizing section of the mill. A 4-bar rotor is used in conjunction with a multiple deflector liner to perform the pulverization. The rotor combined with the multiple deflector liner creates high-speed rotor on particle, particle on particle and particle on liner collisions which, in turn, produce the pulverizing action. Various parameters such as feed rate, rotor speed, classifier speed, classifier type and airflow can be varied to obtain a product with desired degree of pulverization.

We have also found that treating the ground clay (before or after a pulverization step) with a mineral or organic acid can further increase the surface area of the pigment. For example, the surface area of ground kaolin clay increases from ~40 $m^2/g$ to ~150$m^2/g$ when treated with 1 M sulfuric acid at 90° C. for 4 hr. The same treatment only increases the surface area of the original unground clay from 20$m^2/g$ to 24$m^2/g$. Similarly, the surface area of ground talc and bentonite increases from about 84 and 75 $m^2/g$ to about 243 and 210 $m^2/g$, respectively, upon acid treatment. The same acid treatment increases the surface area from 8 to 11 $m^2/g$ for unground talc and 66 to 132 $m^2/g$ for unground bentonite.

Most of the high brightness calcined clays are fully calcined products. By fully calcined, we mean the product is calcined beyond its exothermic temperature (>980° C.). As true with hydrous clay, the fully calcined clay does not show a high surface area after acid treatment. On the other hand, the surface area of a clay which has been calcined at a lower temperature (referred to as metakaolin) increases many times after acid treatment, but the printed color density of this product is very low due to its high scattering coefficient. However, after high intensity grinding, both the fully calcined clay and the low temperature calcined clay can be acid treated to yield high surface area pigments and provide coatings with good color density, adequate ink absorption, adequate ink drying and good image formation.

We envision supplying the products of this invention in either a dry or slurry form. The slurry product can be prepared at 20–70% solids, preferably 40–65% solids or most preferably 50–60% solids, using either anionic or cationic dispersants. Examples of suitable anionic dispersants are polyacrylates, silicates and phosphates. Examples of suitable cationic dispersants are polyamines and polydialkyldiallylammonium halides, such as dimethyldiallylammonium chloride. Because of the relatively large aggregate particle size of the product, the particles in a slurry have a tendency to settle at the bottom of the storage container within a matter of hours, even though the slurry is optimally dispersed. Suspending agents based on polysaccharides such as carboxymethyl cellulose (CMC), hydroxyethyl cellulose (HEC), hydroxypropyl cellulose (HPC), methyl hydroxypropyl cellulose (MHPC), hydroxymethyl cellulose (HMC), alginate and xanthum gum can be added to the slurry to prevent settling over a period of days. Typically, 0.5–5 Lb/T, preferably 1–3 Lb/T, of these suspending agents are adequate for increasing the Brookfield viscosity and prolonging the stability of the slurry.

However, we have found that these suspending agents, if used in excess (10–100 Lb/T, preferably 10–40 Lb/T) of what is typically required for slurry stabilization, also improve ink drying and optical density as compared to the pigment containing no suspending agent. In this regard, these suspending agents can be used in the pigment of this invention for dual purposes: (a) as a suspending agent and (b) for enhancing end use performance, such as ink drying and optical color density of the printed image.

The present invention is further illustrated by the following examples which are illustrative of certain embodiments designed to teach those of ordinary skill in the art how to practice this invention and to represent the best mode contemplated for carrying out this invention.

Examples 1 and 2 show that high surface area and highly aggregated products can be produced by dry grinding of hydrous clay. These examples also demonstrate that the grinding conditions need to be optimized to produce a product suitable for ink jet coating applications.

EXAMPLE 1

A high brightness Fine No. 1 clay marketed under the trademark (KF90) by Thiele Kaolin Company is used as the starting material. This product is dry ground continuously at varying feed rates using a laboratory high-speed attritor (Model HSA-1, Union Process Co., Akron Ohio) at a stirring speed of 1100 RPM with 2000 ml of zirconium silicate media (2.0–2.5 mm beads) and a discharge screen of 0.6 mm (100% open). The BET surface area and Sedigraph particle size distributions are presented in Table I. The data indicate that the surface area is increased and particle size is decreased with decreases in feed rate. The lower the feed rate, the higher is the grinding intensity. As the grinding intensity increases, the clay particles are broken down into ultrafine particles, which are then aggregated almost instantly to increase the particle size.

Ground samples are evaluated for ink jet coating and printability. Pigments are made down at 60% solids using a Premier mixer under high shear (~4000 RPM). Coating formulations are prepared at 44–46% solids by mixing 15 parts per hundred (pph) of polyvinyl alcohol binder to the anionically dispersed pigment slurry (8 Lb/T of sodium polyacrylate on an active basis). The coatings are applied to a substrate having a basis weight of 70 $m^2/g$ using a manual draw down machine on one side. The coated sheets are dried in a convection oven for 1 minute at 105° C. The coat weight is maintained in the range of 8–10 $g/m^2$. The Hewlett-Packard (HP) print pattern (Paper Acceptance Criteria for Hewlett-Packard Deskjet 500C, 550C and 560 C Printers, $2^{nd}$ edition, Hewlett-Packard Companay, 1994) test images are printed with a HP DeskJet 695C printer. The print is visually observed for ink dry-time (time to absorb ink), visual wicking and bleeding. The print color (cyan, magenta, yellow and black) density is measured using a X-Rite Densitometer Model # 418.

The data in Table I show that the products ground at 6.5 Lb/hr and 10.5 Lb/hr feed rates perform close to each other in terms of color density and dry time. Under the same conditions of stirring speed and media volume, feed rates greater than or equal to 19.2 Lb/hr results in poor ink jet performance in terms of color density and dry-time. This is presumably due to a lower degree of aggregation at the higher feed rates which results in a lower porosity of the coating film.

The original Kaofine 90 feed results in a high black ink density but has a very poor color density and an unacceptable image quality. Ink in the color prints is agglomerated, and a poor image is formed. The product ground at 36 Lb/hr feed rate performs almost similar to the original Kaofine 90.

EXAMPLE 2

This example demonstrates the effects of stirring speed and grinding media volume on the physical properties of the ground products and their ink jet coating printability performance.

Kaofine 90 is dry ground using the same attritor as in Example 1 with a 0.6 mm screen opening (100% open) at 10 Lb/hr feed rate at various stirring speeds and media volumes.

TABLE I

|  | Original | \multicolumn{5}{c}{Kaofine 90 Ground at Different Feed Rates} |
| --- | --- | --- | --- | --- | --- | --- |

| Grinding conditions | | | | | | |
| --- | --- | --- | --- | --- | --- | --- |
| Feed rate, Lb./hr | — | 36 | 23 | 19.2 | 10.5 | 6.5 |
| Dry grinding aid (diethylene glycol), ml/Lb | — | 1 | 1 | 1 | 1 | 1 |
| BET Surface area | 21.7 | 27.3 | 29.6 | 31.7 | 39.3 | 43.4 |
| Particle size, | | | | | | |
| % <5.0 $\mu$ | 98.5 | 91.2 | 87.8 | 86.5 | 69.1 | 64.1 |
| % <2.0 $\mu$ | 98.2 | 81.5 | 75.7 | 72.1 | 49.3 | 40.0 |
| % <1.0 $\mu$ | 98.2 | 75.2 | 67.4 | 62.9 | 40 | 29.7 |
| % <0.5 $\mu$ | 91.9 | 59.7 | 50.8 | 48 | 28.2 | 20.4 |
| % <0.2 $\mu$ | 48.0 | 23.7 | 17.8 | 16.6 | 9.2 | 7.9 |
| Scattering coefficient | 0.4911 | 0.4146 | 0.3809 | 0.3421 | 0.2784 | 0.20 |
| | \multicolumn{6}{c}{Ink Jet Printability (Uncalendered)} |
| Color density | | | | | | |
| Cyan | 1.33 | 1.34 | 1.36 | 1.37 | 1.43 | 1.45 |
| Magenta | 1.16 | 1.22 | 1.22 | 1.22 | 1.32 | 1.39 |
| Yellow | 0.90 | 0.95 | 0.94 | 0.91 | 1.02 | 1.07 |
| Black | 1.85 | 1.37 | 1.34 | 1.32 | 1.30 | 1.37 |
| Image Formation | Very | Very Poor | Poor | Poor | Good | Good |
| Ink absorption/dry | 5 | 5 | 5 | 4.0 | 3.5 | 3 |

*1 = best and 5 = worst

Zirconium silicate of 2–2.5 mm size is used as the grinding media. The physical properties and ink jet printability of the products are given in Table II.

TABLE II

| | Original Feed (KF 90) | \multicolumn{5}{c}{Ground KF 90 Products} |
| --- | --- | --- | --- | --- | --- | --- |
| | | I | II | III | IV | V |
| Grinding Conditions | | | | | | |
| Stirring Speed (RPM) | — | 1000 | 1100 | 1100 | 1200 | 1350 |
| Media Volume (ml) | — | 1600 | 2000 | 2400 | 2400 | 2400 |
| Surface area (m$^2$/g) | 21.7 | 37.3 | 46.6 | 49.4 | 40.9 | 29.7 |
| Particle size | | | | | | |
| % <5 $\mu$m | 98.5 | 75.5 | 63.4 | 59.8 | 61.1 | 63.8 |
| % <2 $\mu$m | 98.2 | 56.7 | 41.3 | 35.5 | 34.5 | 34.9 |
| % <1 $\mu$m | 98.2 | 45.9 | 31.1 | 24.0 | 23.3 | 22.7 |
| % <0.5 $\mu$m | 91.9 | 33.0 | 21.8 | 16.7 | 15.9 | 15.1 |
| % <0.2 $\mu$m | 48.0 | 10.2 | 6.9 | 5.6 | 4.7 | 5.9 |

TABLE II-continued

Ink Jet Printability
(Soft Nip Calendered @ 1 Nip/side, 55 PLI at 160° F.)

Color Density

| | | | | | | |
|---|---|---|---|---|---|---|
| Cyan | 1.36 | 1.46 | 1.54 | 1.58 | 1.58 | 1.61 |
| Magenta | 1.24 | 1.29 | 1.44 | 1.45 | 1.45 | 1.52 |
| Yellow | 0.94 | 1.02 | 1.12 | 1.18 | 1.18 | 1.25 |
| Black | 2.01 | 1.28 | 1.28 | 1.28 | 1.29 | 1.26 |
| Image Formation | Very Poor | Poor | Good | Good | Good | Good |
| Ink drying | 5 | 5 | 3 | 3 | 3 | 3 |

*1-best and 5-worst. PLI = Pressure per Linear Inch

Figure 1:
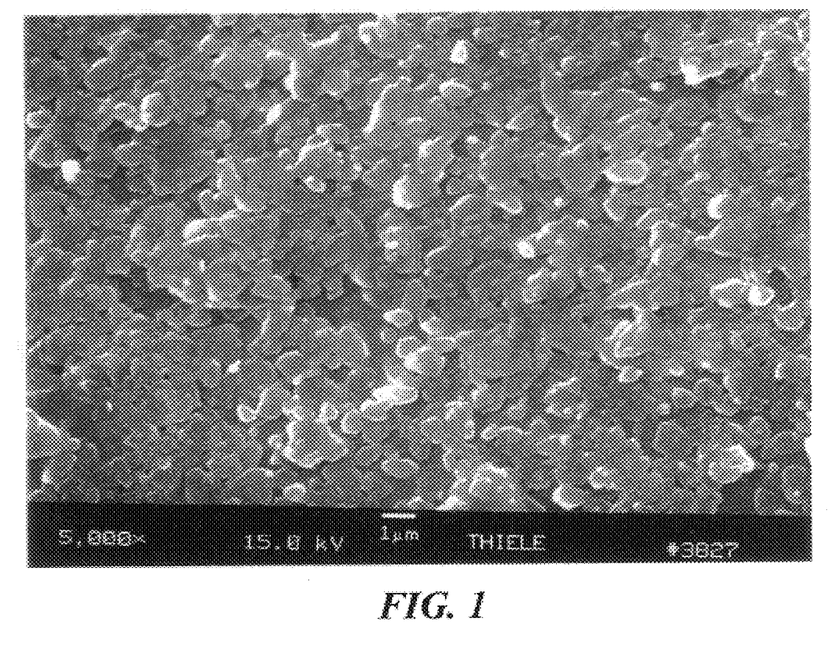
FIG. 1 shows the scanning electron micrograph of the unground Kaofine 90 starting material used in Example 1.
Figure 2:
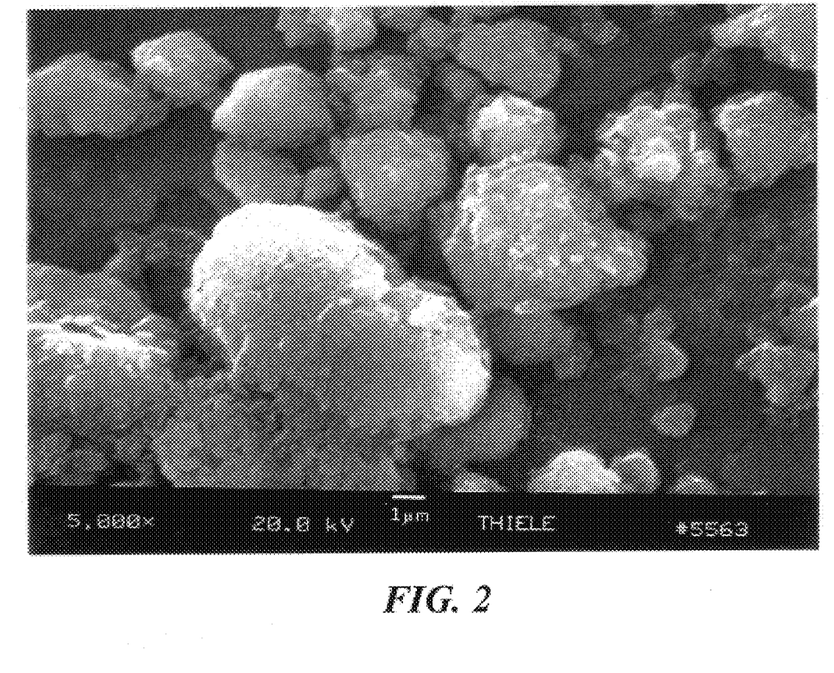
FIG. 2 shows the scanning electron micrograph of the ground Kaofine 90 product described in Example 2.

The data in Table II show that the particle size increases and then levels off with stirring speed and/or media volume. The particle size increases as a result of the aggregation of ultrafine particles. This can also be seen in the scanning electron micrographs (FIGS. 1–2). The surface area first increases and then decreases with increasing media volume and/or stirring speed. The decrease in surface area after initial increase can be attributed to the formation of harder (more compact) aggregates with increasing grinding intensity. The stirring speed and/or media volume results in increased grinding intensity.

The ground samples are evaluated for ink jet coating and printability. Pigment slurries are made down at 60% solids. Coating formulations are prepared at 44–46% solids with 13 pph of polyvinyl alcohol (partially hydrolyzed Airvol 21-205 grade from, Air Products & Chemicals, Inc.) and 5 pph of poly-DADMAC dye retention agent (cationic polymer of low molecular weight and high charge) in each case. The coatings are tested and applied to a base sheet (~90 gm/m$^2$) using a manual draw down machine. The coat weight is maintained in the range of 8–10 gm/M$^2$. The coated sheets are conditioned in a standard humidity room and then soft nip calendered (1 Nip/side, 55 PLI at 160° F.) using a laboratory calender.

The Hewlett-Packard print pattern test images are printed with a HP DeskJet 695C printer. The print is visually observed for ink dry-time (time to absorb ink), print density (cyan, magenta, yellow and black), visual wicking and bleeding. The ink jet print performance improves with increasing stirring speed and/or media volume.

Examples 3–8 demonstrate that the process of the present invention can be used to produce products suitable for ink jet coating applications from hydrous kaolin of different particle size distributions, calcined clay and other mineral compositions such as ground calcium carbonate (GCC), precipitated calcium carbonate (PCC), bentonite and talc.

EXAMPLE 3

Hydrous kaolins of different particle size distributions and type (KAOFINE 90, KAOBRITE 90 and KAOWHITE S) are ground using a HSA-1 attritor at 1200 RPM, 2400 ml zirconium silicate media (2–2.5 mm), 10 Lb/hr feed rate and with 0.6 mm discharge screen size (100% open). Kaofine 90 is a Fine No.1 clay. Kaobrite 90 is a high brightness No. 2 clay, while Kaowhite S is a standard brightness delmainated clay. The product characteristics before and after grinding are compared in Table III, and the ink jet printability is given in Table IV. The ink jet printability of the products of this invention is also compared against commercially used silica pigments.

TABLE III

| | Kaofine 90 | | Kaobrite 90 | | Kaowhite S | |
|---|---|---|---|---|---|---|
| | Unground | Ground | Unground | Ground | Unground | Ground |
| BET Surface area (m$^2$/g) | 21.7 | 35.5–46.2* | 16.6 | 36.7 | 14.5 | 49.0 |
| Particle size, % | | | | | | |
| <5.0 μ | 98.5 | 63.0 | 96.9 | 62.9 | 97.0 | 67.3 |
| <2.0 μ | 98.2 | 37.8 | 85.6 | 36.4 | 82.4 | 43.3 |
| <1.0 μ | 98.2 | 27.8 | 73.5 | 24.1 | 63.8 | 28.5 |
| <0.5 μ | 91.9 | 18.3 | 56.2 | 13.8 | 41.6 | 15.7 |
| <0.2 μ | 48.0 | 6.8 | 27.3 | 6.8 | 19.4 | 4.3 |
| Mercury intrusion | | | | | | |
| Pore volume, ml/g | 0.28 | 0.45–0.48* | 0.31 | 0.45 | 0.34 | 0.44 |
| **Pore size, nm | 56 | 724–1351* | 62 & 469 | 851 | 62 & 337 | 586 |
| Scattering coeff. (457 nm) | 0.4911 | 0.2626 | 0.3593 | 0.2566 | 0.4053 | 0.2693 |

*Range for several products ground at different times. **Dominant pore size

For each clay type, the data presented in Table III indicate that surface area particle size, pore volume and pore size (diameter) increase, while scattering coefficient decreases with grinding. These properties are comparable to each other for all the ground products.

The data in Table IV show that the ground products are improved in color density, ink drying and image formation over the unground products. Table IV also shows that the print qualities of the pigments of this invention are highly comparable to silica coatings. In addition, the coating colors using the pigments of this invention can be made down at much higher solids as compared to silica.

The binder (polyvinyl alcohol) requirement is much lower for the pigments of our invention (13 parts or less) than for silica (30 parts or higher). Also, the pigments of our invention decreases the binder requirement for silica. For example, one skilled in the art would expect that a 50/50 mixture of silica and a pigment of this invention would have a binder requirement of about 21.5 parts (30 parts for the silica portion and 13 parts for our pigment=21.5 parts at 50/50). However, due to the presence of our pigment, the binder requirement for a 50/50 mixture is only 13 parts or lower.

TABLE IV

Coating Formulations

| | | | | | | | | |
|---|---|---|---|---|---|---|---|---|
| Kaofine 90 | 100 | — | — | — | — | — | — | — |
| Kaofine 90, Ground | — | 100 | 100 | — | — | — | — | — |
| Kaobrite 90 | — | — | — | 100 | — | — | — | — |
| Kaobrite 90, Ground | — | — | — | — | 100 | — | — | — |
| Kaowhite S | — | — | — | — | — | 100 | — | — |
| Kaowhite S, Ground | — | — | — | — | — | — | 100 | — |
| Precipitated silica, FK310 | — | — | — | — | — | — | — | 80 |
| Fumed silica, MOX 170 | — | — | — | — | — | — | — | 20 |
| Polyvinyl alcohol | 13 | 13 | 13 | 13 | 13 | 13 | 13 | 30 |
| Poly-DADMAC | 5 | 5 | 5 | 5 | 5 | 5 | 5 | 0.5 |
| Coating pH | | 5.9 | | 6.2 | 6.0 | 5.8 | 6.1 | |
| Solids, % | 45.2 | 44.0 | | 42.1 | 43.0 | 40.7 | 47.3 | 27.9 |

Ink Jet Printability (Calendered sheets)
(Soft Nip Calendered @ 1 Nip/side, 55 PLI at 160° F.)

Color Density

| | | | | | | | | |
|---|---|---|---|---|---|---|---|---|
| Cyan | 1.36 | 1.59 | 1.59 | 1.34 | 1.55 | 1.26 | 1.52 | 1.44 |
| Magenta | 1.24 | 1.55 | 1.55 | 1.26 | 1.54 | 1.18 | 1.49 | 1.32 |
| Yellow | 0.94 | 1.28 | 1.28 | 1.09 | 1.26 | 0.99 | 1.23 | 1.10 |
| Black | 2.01 | 1.33 | 1.26 | 1.62 | 1.34 | 1.75 | 1.30 | 1.42 |
| Image Formation | Very poor | Good | Good | Very Poor | Good | Very Poor | Good | Good |
| Ink absorption* | 5 | 3 | 2 | 5 | 3 | 5 | 3 | 1 |

*1-best and 5-worst. PLI = Pressure Per Linear Inch

EXAMPLE 4

KAOCAL and a 25/75 blend of KAOCAL/KAOFINE 90 are ground following the procedure described in Example 3 except that the feed rate for KAOCAL is 7 Lb/hr. The product characteristics before and after grinding are compared in Table V.

TABLE V

| | Kaocal | | 25/75 KAOCAL/KAOFINE 90 | |
|---|---|---|---|---|
| | Unground | Ground | Unground | Ground |
| BET Surface area (m²/g) | 16.6 | 23.2 | 21.0 | 41.2 |
| Particle size, % | | | | |
| <5.0 μ | 96.0 | 66.5 | 98.3 | 60.3 |
| <2.0 μ | 88.1 | 46.4 | 95.8 | 37.2 |
| <1.0 μ | 73.1 | 38.5 | 90.5 | 27.9 |
| <0.5 μ | 16.7 | 26.2 | 72.3 | 18.5 |
| <0.2 μ | 0 | 6.5 | 37.5 | 5.8 |
| Mercury intrusion | | | | |
| Pore volume, ml/g | 1.1324 | 0.5042 | 0.5419 | 0.3992 |
| *Pore size, nm | 337 | 438 | 62 & 390 | 137 & 1693 |
| Scattering coeff. (457 nm) | 1.2924 | 0.3642 | 0.6466 | 0.2741 |

*Dominant pore size

Figure 3:
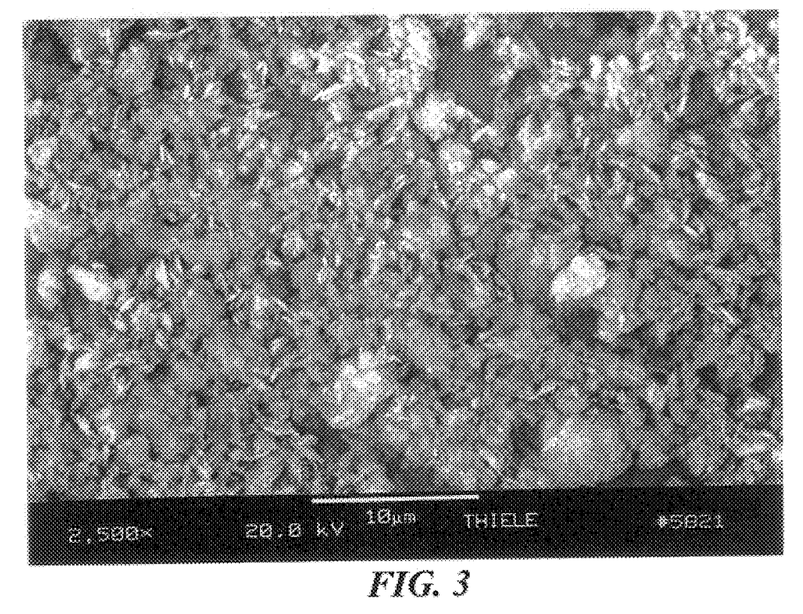
FIG. 3 shows the scanning electron micrograph of the unground Kaocal starting material used in Example 4.
Figure 4:
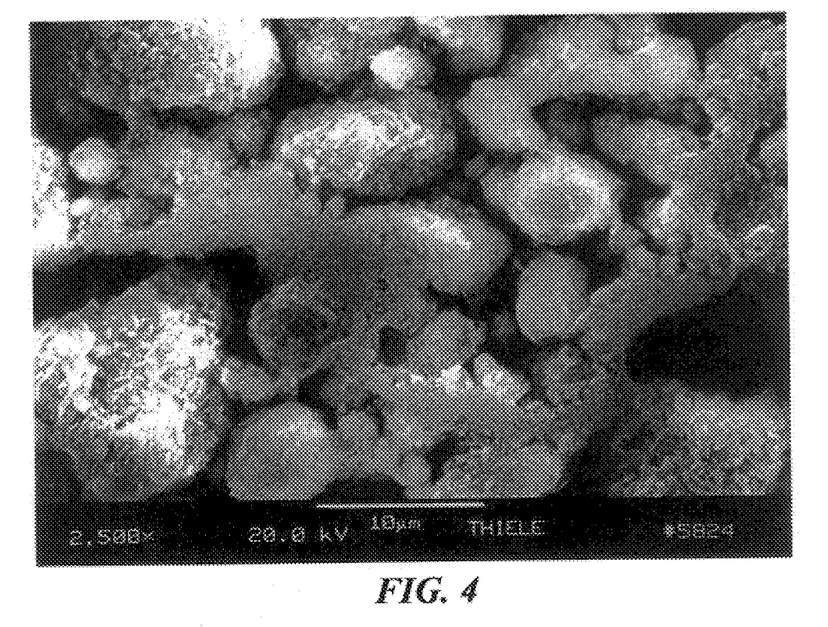
FIG. 4 shows the scanning electron micrograph of the ground Kaocal product described in Example 4.

The data in Table V show that both the surface area and particle size are increased, while the pore volume and scattering coefficient are decreased upon grinding. The grinding process breaks the original low bulk density, high pore volume and high light scattering aggregates of the calcined clay followed by instant re-aggregation of ground particles into larger and denser aggregates. The high degree of aggregation in the ground product can be seen in the scanning electron micrographs shown in FIGS. 3–4.

The ink jet printability data of the ground and unground products are compared in Table VI. The ground products show a significant improvement in color densities (cyan, magenta, yellow and black) and image formation. The grinding process effectively reduces the light scattering of the calcined clay which, in turn, increases the color densities of the printed image.

TABLE VI

| Coating Formulations | | | | |
|---|---|---|---|---|
| Kaocal | 100 | — | — | — |
| Kaocal, Ground | — | 100 | — | — |
| 25/75 Kaocal/Kaofine 90 | — | — | 100 | — |
| 25/75 Kaocal/Kaofine 90, Ground | — | — | — | 100 |
| Polyvinyl alcohol | 13 | 13 | 13 | 13 |
| Poly-DADMAC | 5 | 5 | 5 | 5 |
| Coating pH | 5.2 | 7.4 | 5.9 | 5.8 |
| Solids, % | 37.6 | 42.5 | 43.0 | 44.0 |
| Ink Jet Printability (Uncalendered Sheets) | | | | |
| Color Density | | | | |
| Cyan | 0.89 | 1.51 | 1.35 | 1.61 |
| Magenta | 0.89 | 1.44 | 1.14 | 1.51 |
| Yellow | 0.69 | 1.09 | 0.86 | 1.22 |
| Black | 1.75 | 1.30 | 1.82 | 1.38 |
| Image Formation | Poor | Good | Poor | Good |
| Ink absorption* | 3 | 3 | 5 | 3 |

*1-best and 5-worst.

EXAMPLE 5

This example shows that 100% natural ground calcium carbonate (GCC—sold as Hydrocarb 90 by Omya, Inc., Proctor, Vt.) and the blends of GCC and clay (KF90) can be ground by using the process of this invention to produce pigments suitable for ink jet coating applications. Blends are prepared by mixing the appropriate amounts of each slurry followed by spray drying. The 100% GCC and the blends are ground using the process described in Example 3. The product characteristics of ground and unground samples are presented in Table VII. The characteristics of ground and unground KF90 are also given for comparison.

Grinding GCC using a HS A-1 attritor is extremely difficult due to screen clogging. However, the problem is eliminated when the GCC/clay blend is used, indicating that the clay actually serves as a grinding aid for the calcium carbonate.

The pigment properties presented in Table VII indicate that surface area, particle size, pore volume and pore size increase with grinding. Surface area increases with increases in the Kaofine 90 level, while the particle size of all the products are very similar to each other. Although the pore volume of 100% Kaofine 90 and the blend samples are essentially the same, the pore volume is much improved for 100% GCC.

Figure 5:
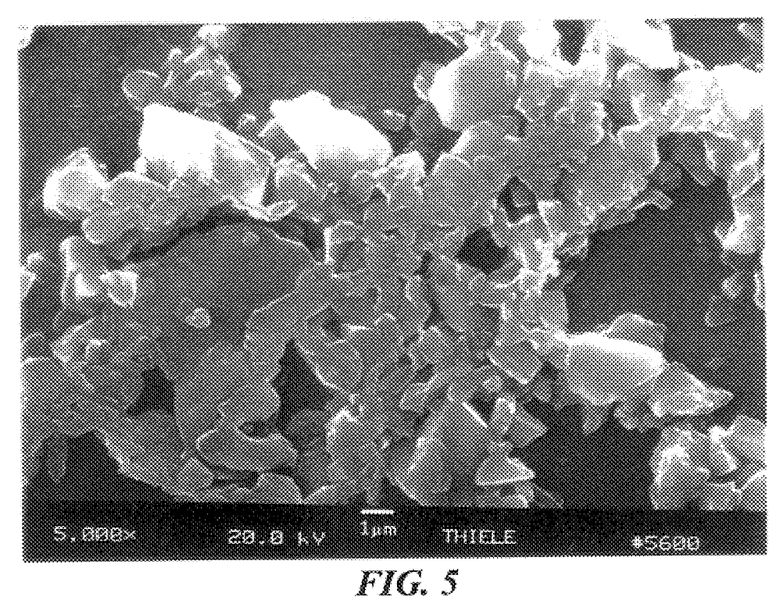
FIG. 5 shows the scanning electron micrograph of the natural calcium carbonate starting material used in Example 5.
Figure 6:
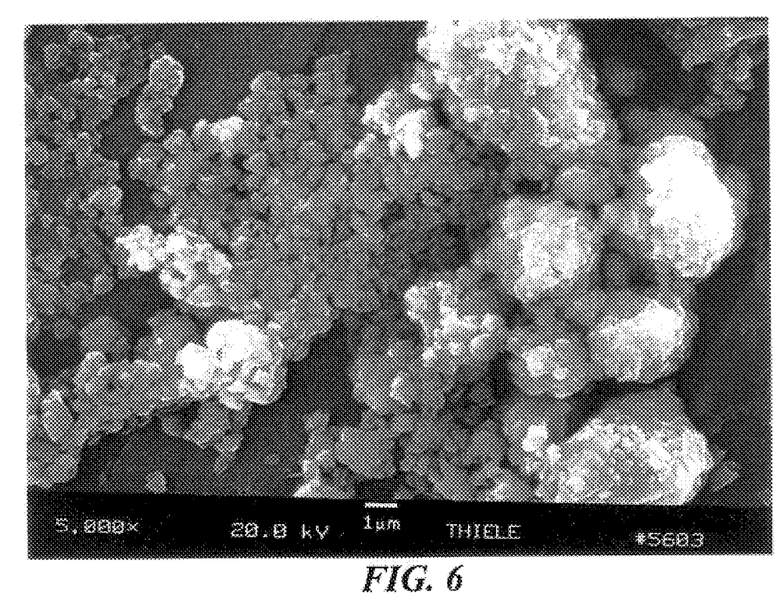
FIG. 6 shows the scanning electron micrograph of the calcium carbonate product described in Example 5.

Scanning electron micrographs (FIGS. 5–6) show that all of the ground products are highly aggregated, and the degree of aggregation increases with the clay level.

The data in Table VIII show that all of the ground products are improved in color density, ink drying and image formation over the unground GCC and Kaofine 90 coatings. Also, the ground products are comparable to one another in print performance irrespective of the pigment type (carbonate or clay). The original unground GCC and Kaofine 90 coatings do not form proper images due to slower ink/ink solvent absorption as compared to the ground pigment coatings.

TABLE VIII

| | Coating Formulations | | | | |
|---|---|---|---|---|---|
| | 1 | 2 | 3 | 4 | 5 |
| Hydrocarb 90 (HC 90) | 100 | — | — | — | — |
| Hydrocarb 90, Ground | — | 100 | — | — | — |
| 50/50 HC90/KF90, Ground | — | — | 100 | — | — |
| 25/75 HC90/KF90, Ground | — | — | — | 100 | — |
| Kaofine 90, Ground | — | — | — | — | 100 |
| Polyvinyl alcohol | 13 | 13 | 13 | 13 | 13 |
| Poly-DADMAC | 5 | 5 | 5 | 5 | 5 |
| Coating pH | 8.0 | 8.0 | 7.7 | 7.5 | 5.9 |
| Solids, % | 42.2 | 42.3 | 45.0 | 44.5 | 44.0 |

TABLE VII

| | Ground Calcium Carbonate (GCC) | | 50/50 GCC/KF 90 | | 25/75 GCC/KF 90 | | Kaofine 90 (KF 90) | |
|---|---|---|---|---|---|---|---|---|
| | Unground | Ground | Unground | Ground | Unground | Ground | Unground | Ground |
| BET Surface area (m²/g) | 8.7 | 12.1 | 17.2 | 25.2 | 19.5 | 30.5 | 21.7 | 46.2 |
| Particle size (%) | | | | | | | | |
| <5.0 μ | 97.9 | 62 | 99.3 | 59.6 | 98.16 | 61.2 | 98.5 | 63.0 |
| <2.0 μ | 84.2 | 39.6 | 94.6 | 38.3 | 96.3 | 37.4 | 98.2 | 37.8 |
| <1.0 μ | 57.2 | 25.7 | 76.9 | 25.5 | 85.6 | 24.4 | 98.2 | 27.8 |
| <0.5 μ | 29.5 | 12.6 | 54.7 | 14.1 | 69.1 | 14 | 91.9 | 18.3 |
| <0.2 μ | 10.2 | 3.9 | 25.1 | 2.5 | 35 | 3.1 | 48.0 | 6.8 |
| Mercury intrusion | | | | | | | | |
| Pore volume (ml/g) | 0.2711 | 0.7287 | 0.2619 | 0.4486 | 0.2729 | 0.4511 | 0.2776 | 0.45 to 0.48 |
| *Pore size, nm | 74 & 236 | 1349 | — | — | — | — | 56 | 1348 |
| Scattering coeff. (457 nm) | | 0.3443 | 0.1882 | 0.4220 | 0.2046 | 0.4911 | 0.2626 | |

*Dominant pore size

TABLE VIII-continued

Ink Jet Printabiity
(Soft Nip Calendered @ 1 Nip/side, 55 PLI at 160° F.)

Color Density

| | | | | | |
|---|---|---|---|---|---|
| Cyan | 1.27 | 1.56 | 1.56 | 1.58 | 1.59 |
| Magenta | 1.26 | 1.51 | 1.57 | 1.55 | 1.55 |
| Yellow | 1.05 | 1.16 | 1.28 | 1.28 | 1.28 |
| Black | 1.18 | 1.35 | 1.28 | 1.29 | 1.33 |
| Image Formation | Very Poor | Good | Good | Good | Good |
| Ink absorption* | 5 | 3 | 3 | 3 | 3 |

*1-best and 5-worst. PLI = Pressure Per Linear Inch

EXAMPLE 6

A precipitated calcium carbonate (PCC) and a 25/75 blend of PCC/KAOFINE 90 are ground following the procedure described in Example 3, except that the feed rate for PCC is 7 Lb/hr. The feed rate has to be lowered for 100% PCC because of poor flowability from the grinding chamber. The product characteristics before and after grinding are compared in Table IX.

Figure 7:
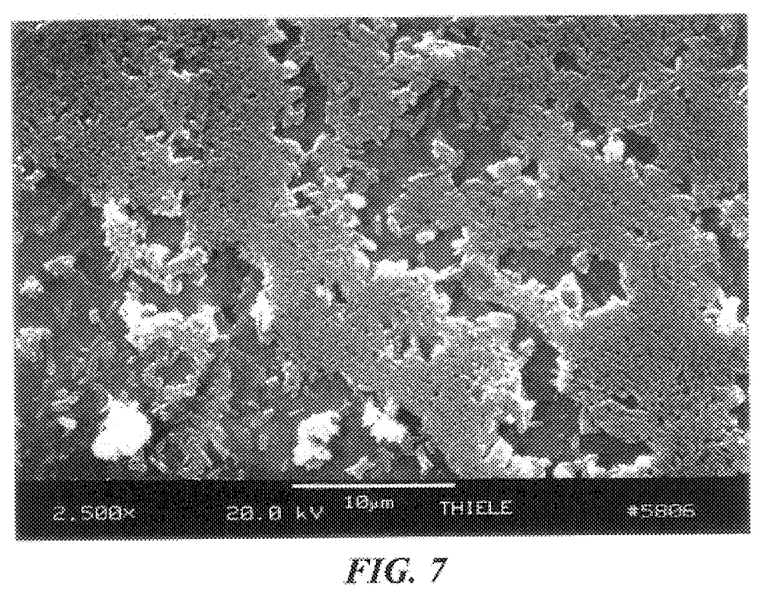
FIG. 7 shows the scanning electron micrograph of the precipitated calcium carbonate starting material used in Example 6.
Figure 8:
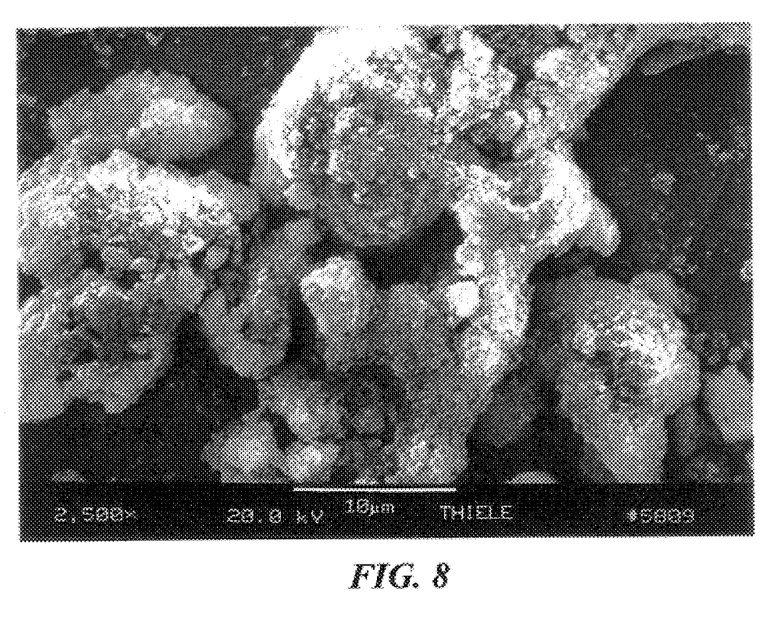
FIG. 8 shows the scanning electron micrograph of the precipitated calcium carbonate product of Example 6.

The pigment properties presented in Table IX indicate that surface area, particle size, pore volume and pore size increase with grinding, while scattering coefficient decreases. Scanning electron micrographs (FIGS. 7–8) show that the ground products are highly aggregated.

TABLE IX

| | PCC | | 25/75, PCC/Kaofine 90 | |
|---|---|---|---|---|
| | Unground | Ground | Unground | Ground |
| BET Surface area (sq. m/g) | 11.4 | 19.2 | 19.7 | 42.3 |
| Particle size, % | | | | |
| <5.0 μ | 99.8 | 60.6 | 99.9 | 62.6 |
| <2.0 μ | 98.4 | 41.1 | 98.9 | 40.7 |
| <1.0 μ | 92.0 | 32.2 | 96.4 | 31.7 |
| <0.5 μ | 65.2 | 20.3 | 82.1 | 21.5 |
| <0.2 μ | 16.6 | 4.3 | 36.7 | 5.1 |
| Mercury intrusion | | | | |
| Pore volume, ml/g | 0.2317 | 0.5076 | 0.2758 | 0.4110 |
| *Pore size, nm | 69 & 131 | 1685 | 62 | 590 |
| Scattering coeff. (457 nm) | 0.4201 | 0.1483 | 0.4687 | 0.2087 |

*Dominant pore size

The data in Table X show that all of the ground products are improved in color density, ink drying and image formation over the unground PCC.

TABLE X

Coating Formulations

| | | | | |
|---|---|---|---|---|
| Precipitated Calcium Carbonate (PCC) | 100 | — | — | — |
| Precipitated Calcium Carbonate (PCC), Ground | — | 100 | — | — |
| 75/25 PCC/Kaofine 90 | — | — | 100 | — |
| 75/25 PCC/Kaofine 90, Ground | — | — | — | 100 |
| Polyvinyl alcohol | 13 | 13 | 13 | 13 |
| Poly-DADMAC | 5 | 5 | 5 | 5 |
| Coating pH | 7.4 | 7.8 | 7.7 | 7.1 |
| Solids, % | 36.7 | 46.1 | 44.1 | 43.1 |

Ink Jet Printability

Color Density

| | | | | |
|---|---|---|---|---|
| Cyan | 1.42 | 1.54 | 1.35 | 1.60 |
| Magenta | 1.26 | 1.54 | 1.18 | 1.53 |
| Yellow | 0.90 | 1.25 | 0.95 | 1.28 |
| Black | 1.60 | 1.35 | 1.72 | 1.37 |
| Image Formation | Poor | Good | Poor | Good |
| Ink absorption* | 5 | 3 | 5 | 3 |

*1-best and 5-worst.

EXAMPLE 7

A sample of sodium bentonite is ground at the same conditions as specified in Example 3. The nitrogen surface area of the bentonite increases from 65.8 m$^2$/g to 74.7 m$^2$/g, and the mercury intrusion pore volume increases from 0.1696 to 0.2846 ml/g after grinding. The particle size also becomes coarser as compared to the starting feed; for example, 60% at <1 μm and 47% at 0.2 μm versus 58% at <1 μm and 27% at <0.2 μm of the ground material. As would be shown in a scanning electron micrograph, the ground product is highly aggregated.

The ink jet printability results of ground and unground bentonite are given in Table XI.

TABLE XI

Coating Formulations

| | 1 | 2 | 3 |
|---|---|---|---|
| Bentonite | 100 | — | — |
| Bentonite, Ground | — | 100 | 100 |
| Polyvinyl alcohol | 13 | 13 | 13 |
| Poly-DADMAC | — | — | 5 |
| Coating pH | 8.0 | 8.0 | 7.5 |
| Solids, % | 15 | 30.0 | 30 |

Ink Jet Printability (Uncalendered)

Color Density

| | | | |
|---|---|---|---|
| Cyan | 1.39 | 1.42 | 1.46 |
| Magenta | 1.31 | 1.35 | 1.35 |
| Yellow | 1.05 | 1.03 | 1.03 |
| Black | 1.50 | 1.52 | 1.52 |
| Image Formation/Acuity | Poor | Good | Good |
| Ink absorption* | 4 | 3 | 2 |

*1-best and 5-worst.

The printability of the ground product is improved over the unground starting bentonite. The starting sodium bentonite swells in water and becomes very viscous, and consequently the coating color can be made down at 15% or lower solids only, while the ground bentonite product coating color can be made down at 30% solids. The swelling effect of the starting material is minimized or eliminated after grinding.

EXAMPLE 8

A sample of talc is ground by the process of Example 3. The pigment characteristics of unground and ground talc and ground blends of talc and clay are shown in Table XII. The surface area and the degree of aggregation increases after grinding for 100% talc and the 25/75 talc/clay blend. However, the particle size of ground talc is smaller than the starting material, because the starting material consists of predominantly large platy particles and appears very coarse by Sedigraph.

TABLE XII

|  | Talc | | | 25/75 Talc/Kaofine 90 | |
| --- | --- | --- | --- | --- | --- |
|  | Unground | Ground Once | Ground Twice | Unground | Ground Once |
| *BET Surface area (m²/g) | 7.7 | 67.7 | 83.5 | 17.3 | 45.3 |
| Particle size, % |  |  |  |  |  |
| <5.0 μ | 67.9 | 82.7 | 71.8 | 92.1 | 71.1 |
| <2.0 μ | 29.6 | 62.7 | 50.6 | 81.3 | 44.9 |
| <1.0 μ | 12.5 | 56.6 | 37.8 | 76.3 | 31.9 |
| <0.5 μ | 2.9 | 28.9 | 25.2 | 68.9 | 20.9 |
| <0.2 μ | 0.5 | 10.3 | 8.7 | 33.4 | 8.1 |
| Mercury intrusion Pore volume, ml/g | 0.3945 | 0.5426 | 0.5426 | 0.3093 | 0.5497 |
| *Pore size, nm | 592 | 296 | 720 | 54 | 54, 390 & 1050 |
| Scattering coefficient (457 nm) | 0.2709 | 0.3692 | 0.2607 | — | — |

*Dominant pore size

Figure 9:
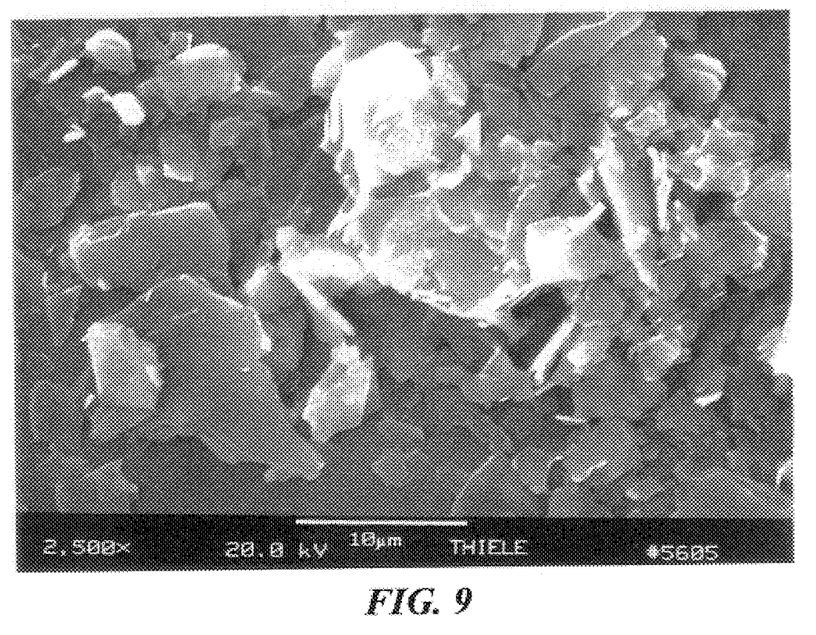
FIG. 9 shows the scanning electron micrograph of the unground talc starting material used in Example 8.
Figure 10:
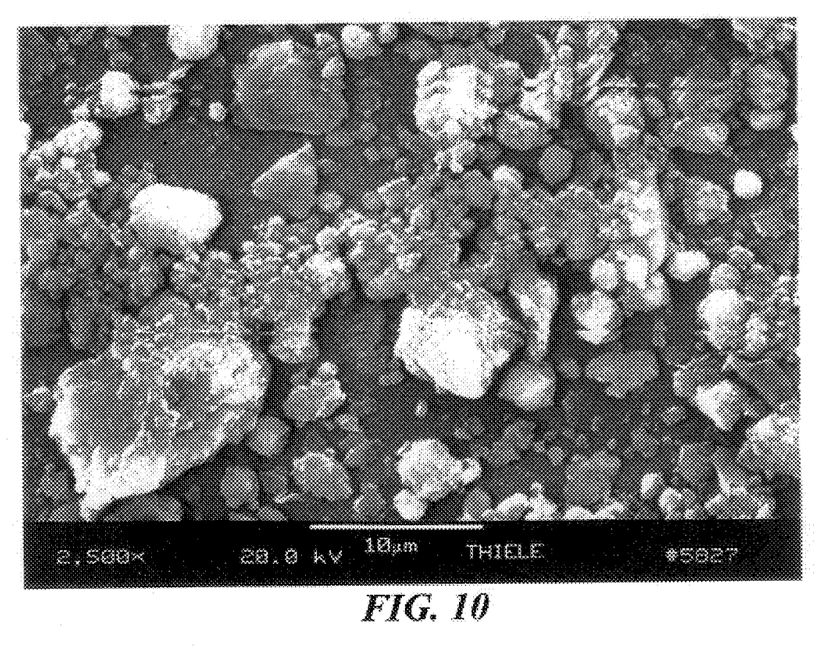
FIG. 10 shows the scanning electron micrograph of the ground talc product described in Example 8.

The large plates are broken down followed by aggregation after grinding, but the aggregates are still smaller than the particle size of the starting material (see FIGS. 9–10). The product ground twice shows a higher degree of aggregation than the product ground once.

The ink jet printability data are given in Table XIII. The color density, drying and image formation improve after grinding. The 100% talc has to be ground twice to obtain an overall improved product.

TABLE XIII

| Coating Formulations | | | | |
| --- | --- | --- | --- | --- |
| Talc (unground) | 100 | — | — | — |
| Talc (Ground (once) | — | 100 | — | — |
| Talc (ground twice) | — | — | 100 | — |
| 75/25 KF 90/Talc (ground once) | — | — | — | 100 |
| Polyvinyl alcohol | 13 | 13 | 13 | 13 |
| Poly-DADMAC | 5 | 5 | 5 | 5 |
| Coating pH | 8.2 | 7.8 | 8.2 | 7.8 |
| Solids, % | 44.5 | 45.0 | 42.6 | 44.0 |
| Ink Jet Printability (Soft Nip Calendered @ 1 Nip/side, 55 PLI at 160° F.) | | | | |
| Color Density | | | | |
| Cyan | 1.16 | 1.45 | 1.47 | 1.53 |
| Magenta | 1.16 | 1.40 | 1.37 | 1.49 |

TABLE XIII-continued

| Yellow | 0.97 | 1.07 | 1.06 | 1.20 |
| --- | --- | --- | --- | --- |
| Black | 1.80 | 1.62 | 1.45 | 1.39 |
| Image Formation/Acuity | poor | poor | good | good |
| Ink Absorption/Drying* | 4 | 3 | 3 | 3 |

*1-best and 5-worst. PLI = Pressure Per Linear Inch

EXAMPLE 9

This example demonstrates that pulverization following the high intensity grinding minimizes 325 mesh screen residue.

KAOFINE 90 is dry ground using a pilot scale high-speed attritor (Model HSA-30 Union Process Co., Akron Ohio). The dry ground sample is then pulverized using a Mikro-ACM-15 mill at different conditions as shown in Table XIV. Particle size (Sedigraph) and wet 325 screen mesh residue are measured (Table XIV). The data indicate that the residue of the feed is reduced from 1.1894% to 0.0001%, depending upon the conditions of pulverization. Also, particle size is decreased with pulverization. Maximum decrease in particle size is observed with Run # 1, Run #2 and Run # 7, indicating that these samples experience maximum pulverization intensity.

TABLE XIV

| Run # | Rate (Lb/hr) | Rotor speed (RPM) | Classifier Speed (RPM | Classifier type | Airflow (CFM) | Particle size (% <2 μm) | 325 mesh residue (%) |
| --- | --- | --- | --- | --- | --- | --- | --- |
| Feed | — | — | — | — | — | 39.6 | 1.1894 |
| 1 | 56 | 7000 | 4000 | 24 long 30° | 350 | 60.5 | 0.0125 |
| 2 | 121 | 7000 | 4000 | 24 long 30° | 350 | 59.1 | 0.0010 |
| 3 | 440 | 7000 | 2000 | 24 long 30° | 500 | 45.9 | 0.0698 |
| 4 | 500 | 7000 | 2500 | 24 long 30° | 500 | 46.9 | 0.0625 |
| 5 | 478 | 7000 | 3000 | 24 long 30° | 500 | 49.4 | 0.1185 |
| 6 | 209 | 7000 | 3000 | 24 long 30° | 400 | 53.4 | 0.0442 |
| 7 | 160 | 7000 | 3500 | 24 long 30° | 400 | 58.9 | 0.0045 |
| 8 | 187 | 7000 | 3500 | 48 long | 350 | 56.1 | 0.0019 |
| 9 | 179 | 7000 | 3000 | 48 long | 350 | 55.3 | 0.0015 |
| 10 | 176 | 7000 | 2000 | 48 long | 350 | 52.6 | 0.0016 |

TABLE XIV-continued

| Run # | Rate (Lb/hr) | Rotor speed (RPM) | Classifier Speed (RPM | Classifier type | Airflow (CFM) | Particle size (% <2 μm) | 325 mesh residue (%) |
|---|---|---|---|---|---|---|---|
| 11 | 201 | 7000 | 3000 | 48 long | 400 | 54.8 | 0.0007 |
| 12 | 218 | 7000 | 3000 | 48 long | 400 | 52.6 | 0.0010 |
| 13 | 241 | 7000 | 3000 | 48 long | 400 | 52.4 | 0.0001 |

The ink jet printability of the pulverized products is evaluated for Run # 2 and 13. The data indicates that Run #13 is improved in color density and ink absorption as compared to Run #2. This indicates that excessive reduction in particle size by pulverization should be avoided.

EXAMPLE 10

This example demonstrates that acid leaching can further increase the surface area of the products of this invention.

Various unground and ground products are treated with a mineral acid such as sulfuric acid at various concentrations, temperatures and periods of time. The product type, acid treatment condition and the surface area of the products are given in Table XV. The data show that the product of this invention can be treated with an acid to further increase the surface area, while the original hydrous kaolin (KAOFINE 90) fully calcined clay (KAOCAL), bentonite and talc do not respond to this treatment in a significant way. For example, surface area of original KAOFINE 90 only increases from 21.7 $m^2/g$ to 24.7$m^2/g$ after acid treatment, while the surface area of the ground product increases from 49.9 $m^2/g$ to as high as 219$m^2/g$ upon acid treatment.

TABLE XV

| No. | Sample Type/Treatment Conditions | Surface Area ($m^2/g$) |
|---|---|---|
| 1 | Original KAOFINE 90 (no treatment) | 21.7 |
| 2 | No.1 treated with acid (1 M acid, 4 hr, 90° C.) | 24.7 |
| 3 | KAOFINE 90 ground @ 1100 RPM, 2000 ml media volume and 6.5 Lb/hr feed rate | 49.9 |
| 4 | No. 3 treated with acid (1 M acid, 1 hr, 60° C.) | 113 |
| 5 | No. 3 treated with acid (1 M acid, 4 hr, 60° C.) | 135 |
| 6 | No. 3 treated with acid (1 M, 1 hr, 90° C.) | 119 |
| 7 | No. 3 treated with acid (1 M acid, 4 hr, 90° C.) | 174 |
| 8 | No. 3 treated with acid (pH = 2, 1 hr, 60° C.) | 67.3 |
| 9 | No. 3 treated with acid (0.5 M, 4 hr, 90° C.) | 124 |
| 10 | No. 3 treated with acid (5 M, 2 hr at Room Temp, and 2 hr at 90° C.) | 219 |
| 11 | Original KAOCAL (no treatment) | 16.6 |
| 12 | No. 11 treated with acid (1 M acid, 4 hr., 90° C.) | 20.9 |
| 13 | KAOCAL ground @ 1200 RPM, 2400 ml media volume and 7 Lb/hr feed rate | 23.2 |
| 14 | No. 13 treated with acid (1 M acid, 4 hr., 90° C.) | 99.8 |
| 15 | Metakaolin (no treatment) | 22.5 |
| 16 | No. 15 treated with acid (1 M acid, 4 hr., 90° C.) | 150 |
| 17 | No. 15 treatment with acid (5 M acid, 4 hr., 90° C.) | 391 |
| 18 | Metakaolin ground @ 1100 RPM, 2000 ml media volume and 6.5 Lb/hr feed rate | 19.1 |
| 19 | No. 18 treated with acid (1 M acid, 4 hr., 90° C.) | 92.1 |
| 20 | Original BENTONITE (no treatment) | 65.8 |
| 21 | No. 20 treated with acid (1 M acid, 4 hr., 90° C.) | 131.7 |
| 22 | BENTONITE ground @ 1200 RPM, 2400 ml media volume and 10 Lb/hr feed rate | 74.7 |
| 23 | No. 22 treated with acid (1 M acid, 4 hr., 90° C.) | 209.5 |
| 24 | Original TALC (no treatment) | 7.7 |
| 25 | No. 24 treated with acid (1 M acid, 4 hr., 90° C.) | 11.2 |
| 26 | TALC ground twice @ 1200 RPM, 2400 ml media volume and 10 Lb/hr feed rate | 83.5 |
| 27 | No. 26 treated with acid @ 1200 RPM, 2400 ml media volume and 10 Lb/hr feed rate | 243.4 |

EXAMPLE 10-A

This example shows that the acid leached high surface area of this invention provides improved ink absorption as compared to the unleached product.

Thirty-six hundred grams ground product of this invention produced from KAOFINE 90 feed (HSA-1 attritor, 2400ml media volume, 1200 RPM stirring speed) is treated with 1.52 M sulfuric acid at 90° C. for 4 hr. The suspension solids is 20%. After 4 hours, the treated product is filtered and washed several times to remove excess acid. The washed filter cake is dispersed directly at 47% solids using 16 Lb/T (active basis) sodium polyacrylate as dispersant. A portion of the dispersed slurry is directly used to make the coating color. The remaining dispersed slurry at 47% solids is diluted to 28% and spray dried and then redispersed at 50% solids using an additional 0.6 Lb/T (active) sodium polyacrylate dispersant. The surface area of the product is 177 $m^2/g$ as compared to the surface area of 38 $m^2/g$ of the starting ground product.

Both the dispersed filter cake at 47% solids and the spray dried and redispersed slurry at 50% are evaluated for ink jet printability. Thirteen parts polyvinyl alcohol is used as a binder. No other additives are used. The data in Table XV-A show that the acid treated sample is comparable in optical densities to the starting ground material, but the acid treated sample has much improved ink absorption. The ink absorption of this acid treated high surface area product is also close to that of silica. Also, there is no significant difference in ink absorption or color density between the sample that is not dried and the sample that is spray dried.

TABLE XV-A

| | Coating Formulations | | |
|---|---|---|---|
| | Ground KF 90 Control | Acid Leached (not dried) | Acid Leached (spray dried) |
| Kaofine 90 Ground | 100 | — | — |
| Kaofine 90 Ground-Acid Leached (not dried) | — | 100 | — |
| Kaofine 90 Ground-Acid Leached and spray dried | — | — | 100 |
| Polyvinyl alcohol | 13 | 13 | 13 |

TABLE XV-A-continued

Coating Formulations

|  | Ground KF 90 Control | Acid Leached (not dried) | Acid Leached (spray dried) |
|---|---|---|---|
| Coating Color Data | | | |
| pH | 6.8 | 6.4 | 6.2 |
| Solids % | 44.7 | 39.8 | 39.7 |
| Brookfield Viscosity, cP (No. 2 Spindle) | | | |
| 20 RPM | 152 | 280 | 200 |
| 50 RPM | 158 | 256 | 198 |
| 100 RPM | 190 | 248 | 200 |
| Ink Jet Printability (Uncalendered) | | | |
| Color Density | | | |
| Cyan | 1.38 | 1.35 | 1.32 |
| Magenta | 1.25 | 1.21 | 1.12 |
| Yellow | .94 | .96 | .93 |
| Black | 1.31 | 1.33 | 1.32 |
| Ink Absorption* | 3.5 | 1.5 | 1.5 |

*1-Best, 5-Worst.

Examples 11 and 12 show that the slurry product of this invention may need to be stabilized using a suspending agent. In the absence of a suspending agent, the particles in the slurry begin to settle in a matter of minutes. Also, the suspending agents, when used in excess of the dosage required for slurry stabilization, can further enhance the optical density and ink absorption characteristics of the printed objects.

EXAMPLE 11

KAOFINE 90 is dry ground using a pilot scale high-speed attritor (Model HSA-30) is slurried at 62.5% solids and treated with three different types of suspending agents. The final solids of the treated samples is ~58.5%. The Brookfield viscosity of the samples treated with the suspending agents either remain relatively constant or decrease slightly, as shown in Table XVI. Also, these samples do not settle over a period of at least 2 weeks, while the untreated sample begin to settle within 10 minutes.

TABLE XVI

| Suspending Agent → | — | CMC | HPC | MHPC |
|---|---|---|---|---|
| Amount (Lb/Ton) | 0 | 3 | 3 | 3 |
| Solids (%) | 62.5 | 58.6 | 58.5 | 58.5 |
| Ph | 6.9 | 6.9 | 6.9 | 6.9 |
| Brookfield Viscosity (cP) @ 20 RPM | | | | |
| Day 1 | 50 | 570 | 500 | 685 |
| Day 2 | — | 420 | 320 | 570 |
| Day 14 | | 504 | 224 | 410 |
| Settling | Begins to settle within 10 min | No | No | No |

The freshly treated samples are evaluated in an ink jet coating application. There is no significant difference between the treated and untreated samples in the print performance and ink drying characteristics of the coated paper.

EXAMPLE 12

Ground KAOFINE 90 used in Example 11 is also treated with 10, 20 and 40 Lb/T of CMC, HPC, and MHPC suspending agents. Coating colors are prepared using the pigment treated with these suspending agents and coated onto a raw stock. Print evaluation of the coated paper shows (Table XVII) that the samples treated with suspending agents in excess of suspending dosage (<10 Lb/T) improve the color density and ink drying of the coated paper. For example, cyan color density of the untreated sample increases from 1.38 to 1.48 to 1.53, while ink drying (visual rating—lower is better) improves from 3.5 to as low as 1.5 (Table XVII).

TABLE XVII

| Suspending Agent → | | Carboxymethyl cellulose | | | Hydroxypropyl cellulose | | | Methylhydroxypropyl cellulose | | |
|---|---|---|---|---|---|---|---|---|---|---|
| Amount (Lb/T) | 0 | 10 | 20 | 40 | 10 | 20 | 40 | 10 | 20 | 40 |
| Pigment Properties | | | | | | | | | | |
| Solids (%) | 62.5 | 54.8 | 55.2 | 45.6 | 57.7 | 57.5 | 53.7 | 57.7 | 57.7 | 53.7 |
| pH | 7.0 | 6.8 | 6.8 | 6.8 | 7.0 | 7.0 | 7.0 | 7.0 | 6.9 | 7.0 |
| Brookfield Viscosity (cP), 20 RPM | 60 | 1640 | 5500 | 4200 | 262 | 592 | 784 | 760 | 1490 | 2320 |
| Hercules (Kdyne-cm) @ 1100 RPM | 217 | 580 | 1106 | 849 | 277 | 416 | 486 | 252 | 531 | 774 |
| Coating Evaluation | | | | | | | | | | |
| Pigment (parts) | 100 | 100 | 100 | 100 | 100 | 100 | 100 | 100 | 100 | 100 |
| Polyvinyl alcohol (parts) | 13 | 13 | 13 | 13 | 13 | 13 | 13 | 13 | 13 | 13 |
| Coating pH | 7.0 | 6.7 | 6.7 | 6.8 | 6.8 | 6.7 | 6.8 | 6.8 | 6.8 | 6.8 |
| Solids (%) | 43.5 | 42.6 | 42.8 | 40.1 | 42.4 | 42.5 | 42.5 | 42.3 | 42.5 | 42.4 |
| Brookfield (cP) 20 RPM | 156 | 330 | 725 | 1765 | 105 | 125 | 185 | 140 | 250 | 620 |
| Hercules (Kdyne-cm) @ 4400 RPM | 2927 | 3281 | 3937 | 3852 | 3131 | 2977 | 3131 | 2908 | 3211 | 3862 |
| Print Evaluation | | | | | | | | | | |
| Cyan density | 1.38 | 1.48 | 1.49 | 1.49 | 1.48 | 1.46 | 1.49 | 1.49 | 1.51 | 1.53 |
| Magenta density | 1.23 | 1.36 | 1.40 | 1.39 | 1.37 | 1.32 | 1.36 | 1.39 | 1.39 | 1.44 |
| Yellow density | 0.99 | 1.07 | 1.10 | 1.15 | 1.08 | 1.07 | 1.10 | 1.10 | 1.10 | 1.17 |

TABLE XVII-continued

| Suspending Agent → | | Carboxymethyl cellulose | | | Hydroxypropyl cellulose | | | Methylhydroxypropyl cellulose | | |
|---|---|---|---|---|---|---|---|---|---|---|
| Black density | 1.37 | 1.35 | 1.35 | 1.34 | 1.41 | 1.36 | 1.39 | 1.39 | 1.38 | 1.38 |
| Ink absorption* | 3.5 | 2.0 | 2.0 | 1.5 | 2.5 | 2.5 | 2.0 | 2.5 | 2.5 | 2.0 |

*1-best; 5-worst

The present invention has been described in detail with particular reference to certain embodiments, but variations and modifications can be made without departing from the spirit and scope of the invention as defined in the following claims.

What is claimed is:

1. A process for treating mineral compositions, wherein the process comprises the sequential steps of:
   A. obtaining a beneficiated, unground mineral composition starting material selected from the group consisting of hydrous kaolin clay, calcined kaolin clay, natural calcium carbonate, precipitated calcium carbonate, calcium sulfate, aluminum hydroxide, aluminum oxide, iron oxide, iron hydroxide, bentonite, talc, zeolite, titanium dioxide or a mixture of two or more of these materials; and
   B. dry grinding the starting material under conditions of high intensity sufficient to aggregate the ground material,
      whereby the surface area of the ground material is increased over the surface area of the unground starting material.

2. A process as defined by claim 1 wherein the unground starting material is hydrous kaolin clay.

3. A process as defined by claim 1 wherein the unground starting material is calcined kaolin clay.

4. A process as defined by claim 1 wherein the unground starting material is calcium carbonate.

5. A process as defined by claim 1 wherein the unground starting material is bentonite.

6. A process as defined by claim 1 wherein the unground starting material is talc.

7. A process for treating mineral compositions, wherein the process comprises the sequential steps of:
   A. obtaining a beneficiated, unground mineral composition starting material;
   B. dry grinding the starting material under conditions of high intensity sufficient to aggregate the ground material,
      whereby the surface area of the ground material is increased over the surface area of the unground starting material; and
   C. subjecting the ground and aggregated material to a pulverization step,
      whereby the pulverized material is reduced in 325 mesh screen residue compared to the ground and aggregated material prior to pulverization.

8. A process as defined by claim 7 wherein the unground starting material is hydrous kaolin clay, calcined kaolin clay, natural calcium carbonate, precipitated calcium carbonate, calcium sulfate, aluminum hydroxide, aluminum oxide, iron oxide, iron hydroxide, bentonite, talc, zeolite, titanium dioxide or a mixture of two or more of these materials.

9. A process for treating mineral compositions, wherein the process comprises the sequential steps of:
   A. obtaining a beneficiated, unground mineral composition starting material;
   B. dry grinding the starting material under conditions of high intensity sufficient to aggregate the ground material,
      whereby the surface area of the ground material is increased over the surface area of the unground starting material;
   C. subjecting the ground and aggregated material to a pulverization step,
      whereby the pulverized material is reduced in 325 mesh screen residue compared to the ground and aggregated material prior to pulverization; and
   D. subjecting the pulverized material to a slurry makedown step and treating the slurry with a suspending agent,
      whereby the treated slurry is increased in low shear viscosity over the untreated slurry.

10. A process as defined by claim 9 wherein the unground starting material is hydrous kaolin clay, calcined kaolin clay, natural calcium carbonate, precipitated calcium carbonate, calcium sulfate, aluminum hydroxide, oxide, iron oxide, iron hydroxide, and oxide, bentonite, talc, zeolite, titanium dioxide or a mixture of two or more of these materials.

11. A process for treating mineral compositions, wherein the process comprises the sequential steps of:
   A. obtaining a beneficiated, unground mineral composition starting material selected from the group consisting of hydrous kaolin clay, calcined kaolin clay, bentonite, talc, zeolite or a mixture of two or more of these materials;
   B. dry grinding the starting material under conditions of high intensity sufficient to aggregate the ground material; and
   C. subjecting the ground material to an acid treatment,
      whereby the surface area of the acid-treated, ground material is increased over the surface area of the ground starting material prior to acid treatment.

12. A process for treating mineral compositions, wherein the process comprises the sequential steps of:
   A. obtaining a beneficiated, unground mineral composition starting material;
   B. dry grinding the starting material under conditions of high intensity sufficient to aggregate the ground material;
   C. subjecting the ground and aggregated material to a pulverization step,
      whereby the pulverized material is reduced in 325 mesh screen residue compared to the ground and aggregate material prior to pulverization; and
   D. subjecting the pulverized material to an acid treatment,
      whereby the surface area of the acid-treated material is increased over the surface area of the pulverized material prior to acid treatment.

13. A process as defined by claim 12 wherein the unground starting material is hydrous kaolin clay, calcined kaolin clay, bentonite, talc, zeolite or a mixture of two or more of these materials.

14. A process for treating mineral compositions, wherein the process comprises the sequential steps of:
   A. obtaining a beneficiated, unground mineral composition starting material;
   B. dry grinding the starting material under conditions of high intensity sufficient to aggregate the ground material;
   C. subjecting the ground and aggregated material to a pulverization step,
      whereby the pulverized material is reduced in 325 mesh screen residue compared to the ground and aggregated material prior to pulverization;
   D. subjecting the pulverized material to an acid treatment, whereby the surface area of the acid-treated material is increased over the surface area of the pulverized material prior to acid treatment; and
   E. subjecting the acid-treated material to filtration, washing and slurry makedown steps and treating the slurry with a suspending agent,
      whereby the treated slurry is increased in low shear viscosity over the untreated slurry.

15. A process as defined by claim 14 wherein the unground starting material is hydrous kaolin clay, calcined kaolin clay, bentonite, talc, zeolite or a mixture of two or more of these materials.

16. An aggregated mineral pigment having increased surface area wherein the pigment is produced by a process comprising the sequential steps of:
   A. obtaining a beneficiated, unground mineral composition starting material selected from the group consisting of hydrous kaolin clay, calcined kaolin clay, natural calcium carbonate, precipitated calcium carbonate, calcium sulfate, aluminum hydroxide, aluminum oxide, iron oxide, iron hydroxide, bentonite, talc, zeolite, titanium dioxide or a mixture of two or more of these materials; and
   B. dry grinding the starting material under conditions of high intensity sufficient to aggregate the ground material,
      whereby the surface area of the ground material is increased over the surface area of the unground starting material.

17. An aggregated mineral pigment having increased surface area wherein the pigment is produced by a process comprising the sequential steps of:
   A. obtaining a beneficiated, unground mineral composition starting material selected from the group consisting of hydrous kaolin clay, calcined kaolin clay, bentonite, talc, zeolite or a mixture of two or more of these materials;
   B. dry grinding the starting material under conditions of high intensity sufficient to aggregate the ground material; and
   C. subjecting the ground material to an acid treatment,
      whereby the surface area of the acid-treated, ground material is increased over the surface area of the ground starting material prior to acid treatment.

18. A coating and filling pigment produced by a process which comprises the sequential steps of:
   A. obtaining a beneficiated, unground mineral composition starting material; and
   B. dry grinding the starting material under conditions of high intensity sufficient to aggregate the ground material,
      whereby the surface area of the ground material is increased over the surface area of the unground starting material.

19. A coating and filling pigment as defined by claim 18 wherein the unground starting material is hydrous kaolin clay, calcined kaolin clay, natural calcium carbonate, precipitated calcium carbonate, calcium sulfate, aluminum hydroxide, aluminum oxide, iron oxide, iron hydroxide, bentonite, talc, zeolite, titanium dioxide or a mixture of two or more of these materials.

20. A coating and filling pigment produced by a process which comprises the sequential steps of:
   A. obtaining a beneficiated, unground mineral composition starting material;
   B. dry grinding the starting material under conditions of high intensity sufficient to aggregate the ground material; and
   C. subjecting the ground material to an acid treatment,
      whereby the surface area of the acid-treated, ground material is increased over the surface area of the ground starting material prior to acid treatment.

21. A pigment as defined by claim 20 wherein the unground starting material is hydrous kaolin clay, calcined kaolin clay, bentonite, talc, zeolite or a mixture of two or more of these materials.

22. A pigment for an ink jet coating and filling application, wherein the pigment is produced by a process which comprises the sequential steps of:
   A. obtaining a beneficiated, unground mineral composition starting material; and
   B. dry grinding the starting material under conditions of high intensity sufficient to aggregate the ground material,
      whereby the surface area of the ground material is increased over the surface area of the unground starting material.

23. A pigment as defined by claim 22 wherein the unground starting material is hydrous kaolin clay, calcined kaolin clay, natural calcium carbonate, precipitated calcium carbonate, calcium sulfate, aluminum hydroxide, aluminum oxide, iron oxide, iron hydroxide, bentonite, talc, zeolite, titanium dioxide or a mixture of two or more of these materials.

24. A pigment for an ink jet coating and filling application, wherein the pigment is produced by a process which comprises the sequential steps of:
   A. obtaining a beneficiated, unground mineral composition starting material;
   B. dry grinding the starting material under conditions of high intensity sufficient to aggregate the ground material; and
   C. subjecting the ground material to an acid treatment,
      whereby the surface area of the acid-treated, ground material is increased over the surface area of the ground starting material prior to acid treatment.

25. A pigment as defined by claim 24 wherein the unground starting material is hydrous kaolin clay, calcined kaolin clay, bentonite, talc, zeolite or a mixture of two or more of these materials.

26. A paper product coated with a composition which contains an aggregated mineral pigment as defined by claim 16.

27. A paper product coated with a composition which contains an aggregated mineral pigment as defined by claim 17.

* * * * *